United States Patent
Doizaki et al.

(10) Patent No.: US 6,285,015 B1
(45) Date of Patent: Sep. 4, 2001

(54) INDUCTION HEATER WITH A UNIT FOR PREVENTING GENERATION OF SPARKS

(75) Inventors: Tetsuji Doizaki, Tokyo; Kiyoshi Nakano, Fukuyama; Hiroshi Sekine, Fukuyama; Yoichi Motoyashiki, Fukuyama; Manabu Sonobe, Fukushima, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/598,438

(22) Filed: Jun. 22, 2000

(30) Foreign Application Priority Data

Jun. 25, 1999 (JP) .................................................. 11-179164

(51) Int. Cl.[7] ............................... H05B 6/14; H05B 6/40
(52) U.S. Cl. ........................ 219/645; 219/635; 219/653; 219/670; 219/672
(58) Field of Search ................................... 219/645, 646, 219/635, 653, 670, 672, 647

(56) References Cited

U.S. PATENT DOCUMENTS

| | | | |
|---|---|---|---|
| 2,448,690 | * 9/1948 | Storm | 219/670 |
| 4,300,031 | * 11/1981 | Reboux et al. | 219/670 |
| 4,447,690 | * 5/1984 | Grever | 219/670 |
| 4,708,325 | * 11/1987 | Georges | 219/645 |
| 4,795,872 | * 1/1989 | Higisawa et al. | 219/645 |
| 4,987,281 | 1/1991 | Yao . | |
| 5,578,233 | 11/1996 | Arvedi et al. . | |

FOREIGN PATENT DOCUMENTS

| | | |
|---|---|---|
| 8-069866 | 3/1996 | (JP) . |
| 8-69866 | 3/1996 | (JP) . |
| 10-092561 | 4/1998 | (JP) . |
| 11-251047 | 9/1999 | (JP) . |
| 11-269538 | 10/1999 | (JP) . |

* cited by examiner

Primary Examiner—Philip H. Leung
(74) Attorney, Agent, or Firm—Oblon, Spivak, McClelland, Maier & Neustadt, P.C.

(57) ABSTRACT

C-shaped inductors for induction heating a heated steel material that is carried via table rollers. Each C-shaped inductor includes a C-shaped iron core having a pair of legs facing each other by sandwiching a gap through which the heated steel material passes, and heating coils wound around the pair of legs of the C-shaped iron core. A ring-shaped iron core for restricting induced currents generated in the heated steel material is disposed near the C-shaped inductors, and the heated steel material passes through the gap of each C-shaped inductor.

4 Claims, 4 Drawing Sheets

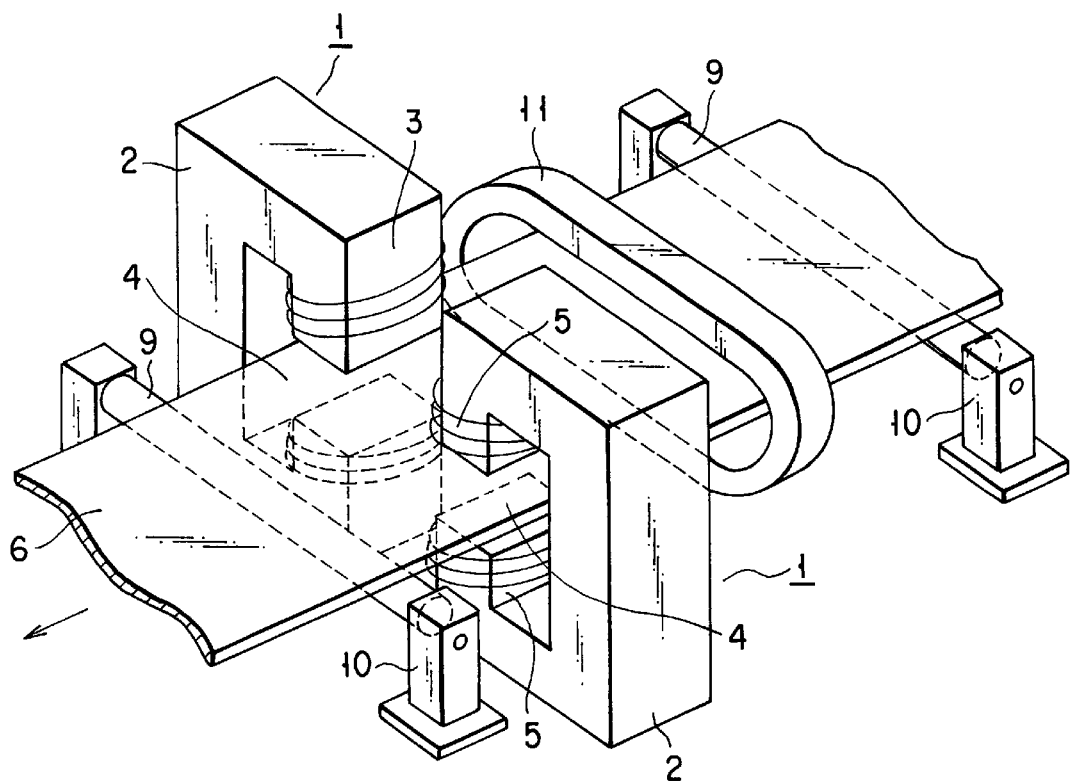
FIG. 4
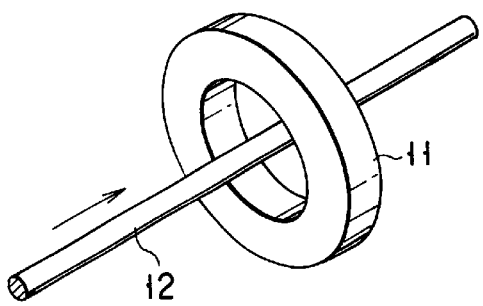
FIG. 5A
FIG. 5B

INDUCTION HEATER WITH A UNIT FOR PREVENTING GENERATION OF SPARKS

CROSS-REFERENCE TO RELATED APPLICATIONS

This application is based upon and claims the benefit of priority from the prior Japanese Patent Application No. 11-179164, filed Jun. 25, 1999, the entire contents of which are incorporated herein by reference.

BACKGROUND OF THE INVENTION

The present invention relates to an induction heater for induction heating heated steel materials that are continuously carried.

In an iron and steel rolling line, generally, heated steel materials are heated to a predetermined temperature in advance, and the heated steel materials are continuously carried to a plurality of rolling mills. The rolling mills sequentially roll the heated steel materials into thin plates. In this rolling process, the heated steel materials radiate heat and are gradually cooled down during carrying. The rolling of the heated steel materials in this state has a quality problem. Therefore, the heated steel materials are heated again before the finish rolling. Thus, the heated steel materials are rolled after the whole heated steel materials have been heated to a high temperature.

For heating the steel materials, a whole heater (a coarse bar heater) formed in a solenoid coil is passed through the heated steel materials to increase the temperatures at all portions of the heated steel materials. Particularly, as the temperatures at both end portions of each heated steel material become lower than the temperature at the center of the heated steel material, a C-shaped inductor is used to locally heat both ends of the steel material. Thus, the temperatures at all portions of the heated steel material are made uniform. The rolling is carried out after this process.

As shown in FIG. 1, a C-shaped inductor 1 for locally heating both ends of the steel material has upper and lower iron core legs 3, 3 formed to sandwich a gap 4 of a C-shaped iron core 2, with heating coils 5, 5 wound around both iron cores. An end portion of a belt-shaped steel material 6 is passed through the gap 4 of the C-shaped inductor 1, and a current is flown through the heating coils 5, 5 from a power source. Thus, a magnetic flux Φ is generated in upward and downward the iron core legs 3, 3. This magnetic flux Φ is interlinked to the heated steel material 6, thereby to induce an eddy current. As a result, Joule heat is generated to heat both end portions of the heated steel material.

According to an induction heater using this C-shaped inductor 1, the heated steel material 6 is supported by table rollers 9 and carried. These table rollers 9 are earth-connected via roller stands 10 respectively. Therefore, an induced current for contributing to the heating flows to the earth through the table rollers 9 of the rolling facility.

An equivalent circuit in this state will be explained with reference to FIG. 2. A magnetic flux Φ interlinks to a loop circuit 7 formed by a resistor R2 of the heated steel material 6 continuously carried and a resistor R1 of an edge portion and to a loop circuit 8 formed by a ground resistor R0 and the resistor R1 of the edge portion. Thus, the alternating magnetic flux Φ interlinks within the closed loop to generate electromagnetic induction. Based on this principle, electromotive force of $E = -d\Phi/dt$ is generated. As a result, induced currents I1 and I2 flow through loop circuits 7 and 8.

With the above arrangement, the current I2 that flows to the earth via the table rollers 9 generates a spark at a contact point between the heated steel material 6 and the table rollers 9. When the level of power applied to the heating coils 5, 5 is high, an arc hurt is generated on the heated steel material 6, which results in a poor finished product.

In order to solve this problem, there has been a method of interrupting a current that flows to the earth, by sandwiching an electric insulating material into the roller stands 10 that support the table rollers 9 and installing the table rollers on the floor.

However, the provision of the insulation processing in the roller stands 10 over the range of a few hundred meters of the rolling facility has had a problem that the introduction of this facility requires a large amount of cost. Further, there has been a problem that oxidized scales are dispersed and are adhered onto the surface of the insulation materials during the use of the facility. This causes an insulation failure.

Further, as another measure against the above problem, there has been a method of setting an electromotive force to zero as shown in FIG. 3. According to this method, two C-shaped inductors 1, 1 are installed in parallel within the closed loop between the roller stands 10, 10. Directions of the magnetic fluxes of the two C-shaped inductors 1, 1 are inverted to set the electromotive force to zero.

However, according to this method, there is a limit to the size for installing the facility. It is not possible to employ this method at a place where the two inductors 1, 1 cannot be installed in parallel.

BRIEF SUMMARY OF THE INVENTION

It is an object of the present invention to provide an induction heater capable of preventing a generation of sparks and capable of manufacturing a high-quality rolled-product, without an increase in the size of the induction heater.

An induction heater of the present invention includes an inductor for induction heating a heated steel material that is carried via table rollers; and an induced-current restricting unit made of an iron core, that is disposed near the inductor, for restricting inducted currents generated in the heated steel material.

According to the present invention, the induced-current restricting unit including an iron core can restrict in high impedance a current that flows to the earth via the table rollers, even at a place where only one inductor can be installed between the table rollers. Thus, it is possible to prevent a generation of sparks, and it is also possible to manufacture a high-quality rolled-product.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a perspective view showing an induction heater according to one embodiment of the present invention.

FIG. 5A is an explanatory diagram showing the principle of the induction heater shown in FIG. 4, and FIG. 5B is an equivalent circuit of this induction heater.

DETAILED DESCRIPTION OF THE INVENTION

Figure 1:
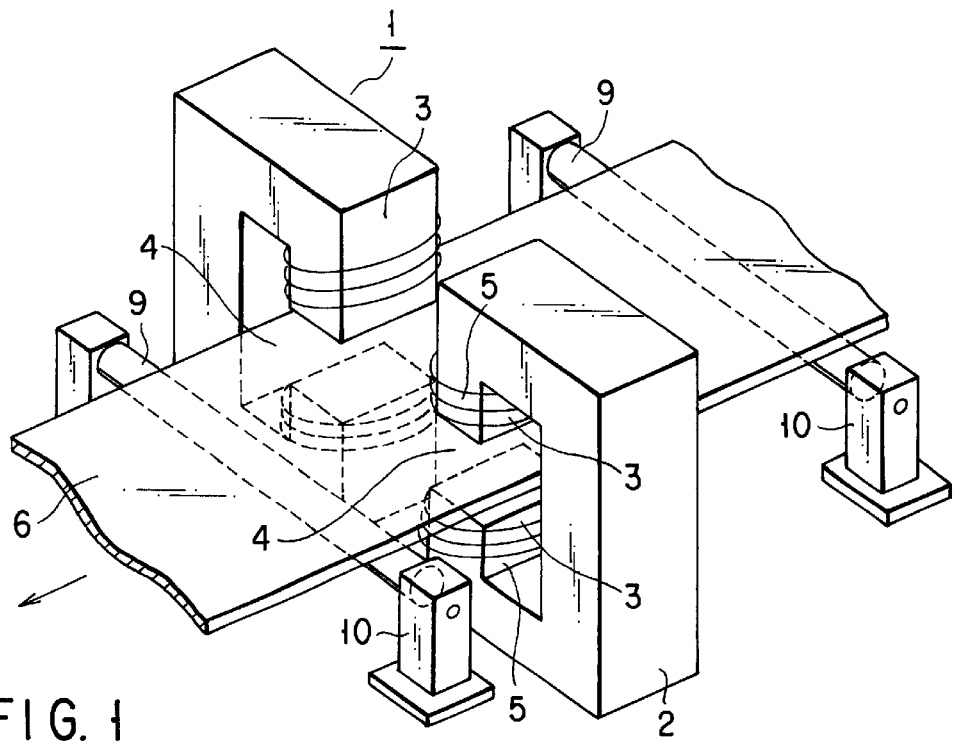
FIG. 1 is a perspective view showing a conventional induction heater.
Figure 2:
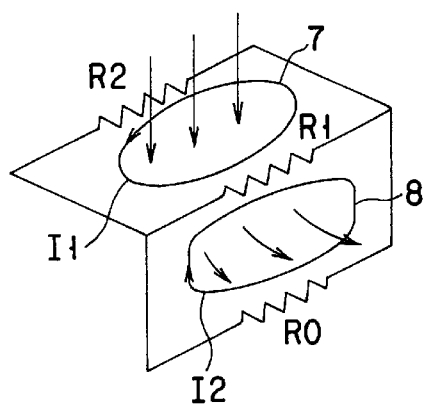
FIG. 2 is a circuit diagram showing an equivalent circuit of the induction heater shown in FIG. 1.
Figure 3:
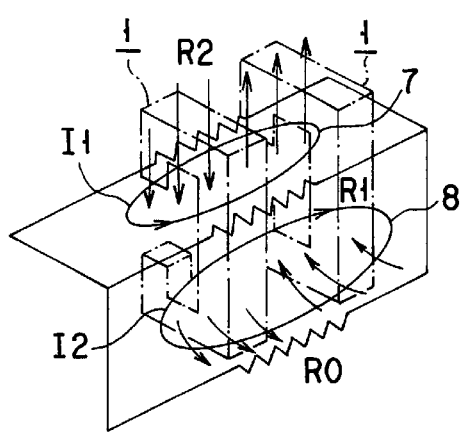
FIG. 3 is a circuit diagram showing an equivalent circuit when two C-shaped inductors are installed in parallel.

One embodiment of the present invention will be explained in detail below with reference to FIGS. 4 to 6.

As shown in FIG. 4, an induction heater of the present embodiment consists of two C-shaped inductors 1,1, and a ring-shaped iron core 11. The two C-shaped inductors 1, 1 are disposed to face each other on both sides of a carried heated steel material 6 supported by table rollers 9 and 9. Both end portions of the belt-shaped heated steel material 6 are passed through gaps 4, 4 of these C-shaped inductors. Each of the C-shaped inductors 1, 1 has the gap 4 of a C-shaped iron core 2 sandwiched between upper and lower iron core legs 3, 3, with heating coils 5, 5 wound around these upper and lower iron core legs 3, 3, and connected to a power source.

A ring-shaped iron core 11 for encircling the whole heated steel material carried is provided at the upstream of the C-shaped inductors 1, 1 between the table rollers 9 and 9 disposed in front and at the rear of the C-shaped inductors 1, 1, respectively.

For heating both end portions of the heated steel material 6 by this induction heater, a high-frequency current is flown to the heating coils 5, 5 of the C-shaped inductors 1, 1 respectively from the power source. Then, a magnetic flux Φ1 is generated. As a result, an induced current I1 flows to a loop circuit 7 formed by a resistor R2 of the heated steel material 6 and a resistor R1 of an edge portion, in a similar manner to that of FIG. 8. When this magnetic flux Φ1 interlinks, an induced current I2 tries to flow to a loop circuit 8 formed by a ground resistor R0 and a resistor R1 of the edge portion.

However, as the ring-shaped iron core 11 is provided, the impedance becomes large, and the induced current I2 cannot flow easily.

This operation will be explained with reference to FIGS. 5A and 5B. As shown in FIG. 5A, when a current is flown through a conductor 12, the ring-shaped iron core 11 is provided to encircle the conductor 12. This will be explained with reference to an equivalent circuit shown in FIG. 5B. This shows a state that a resistor R of the conductor 12 and an inductance L of the iron core 11 are connected in series. In this case, an impedance Z becomes as given by the expression 1.

$$Z=\sqrt{R^2+\omega L^2}$$

Figure 6:
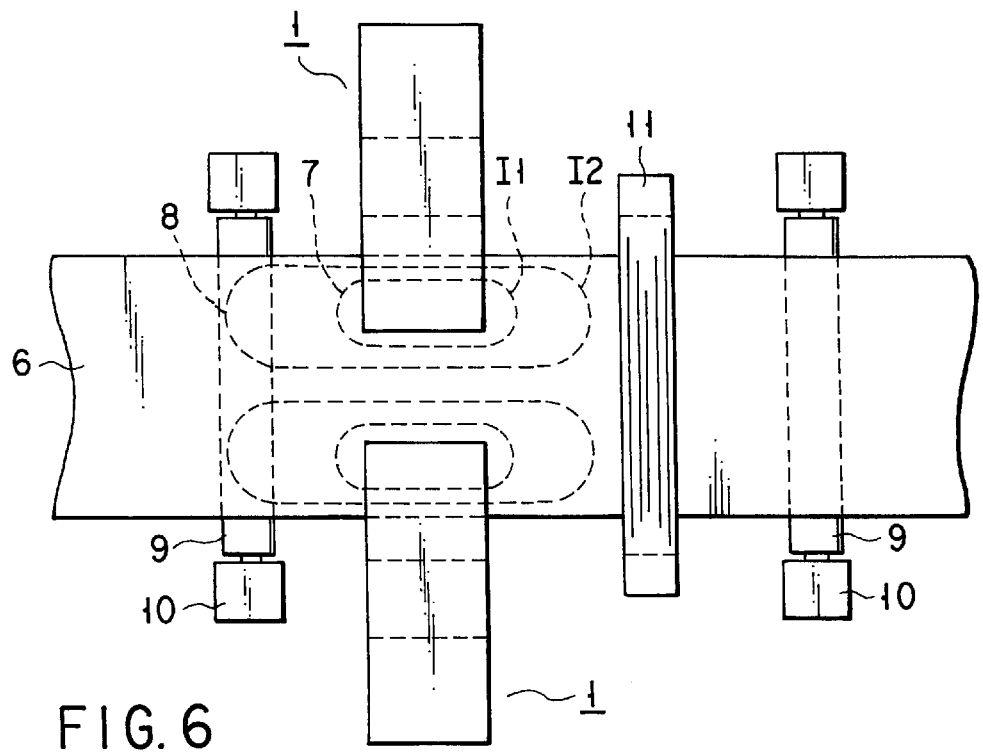
FIG. 6 is a top plan view of the induction heater shown in FIG. 4.

Therefore, as shown in FIG. 6, a large induced current I1 flows to the loop circuit 7 near the C-shaped inductor 1.

However, the impedance Z becomes large in the loop circuit 8 near the ring-shaped iron core 11. Therefore, the induced current I2 cannot flow easily. Accordingly, even when a current flows to one table roller 9, a current does not flow to the table roller 9 at the side of the ring-shaped iron core 11. As the loop circuit 8 is not formed, a generation of sparks at a contact point between the heated steel material 6 and the table roller 9 is prevented. As a result, it is possible to manufacture a rolled steel in satisfactory conditions without an arc hurt formed on the heated steel material 6 due to sparks.

Figure 7:
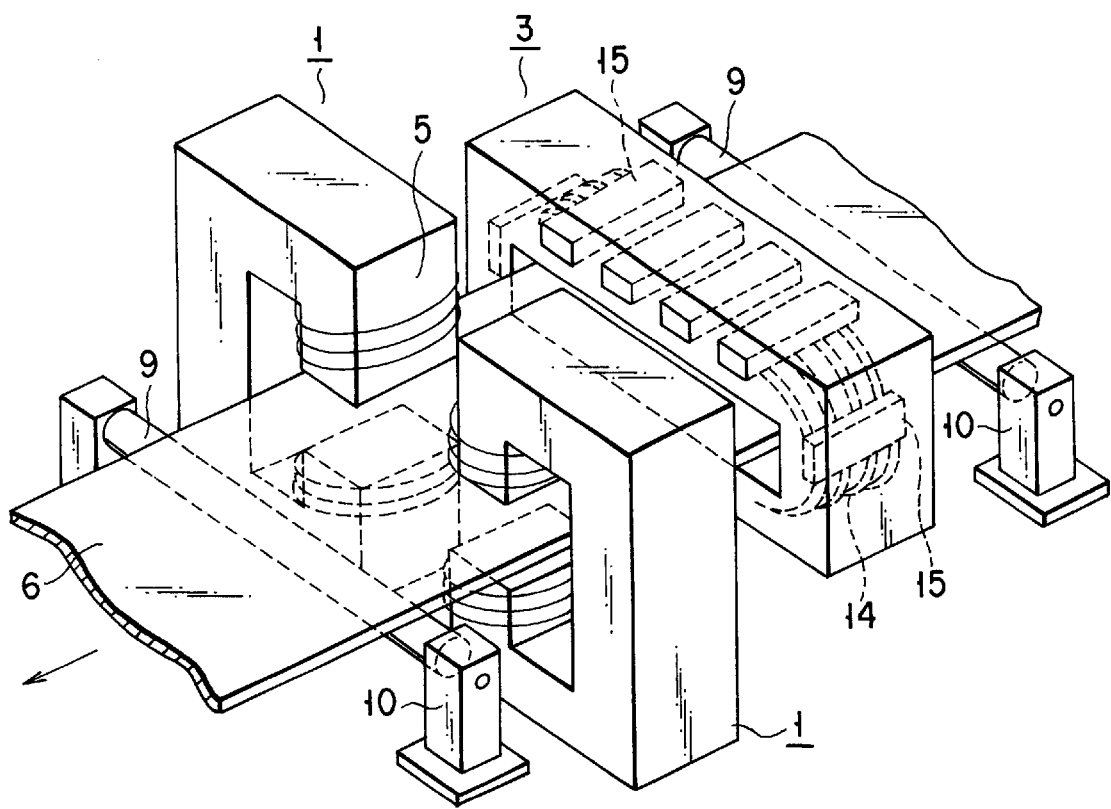
FIG. 7 is a perspective view showing an induction heater according to another embodiment of the present invention.
Figure 8:
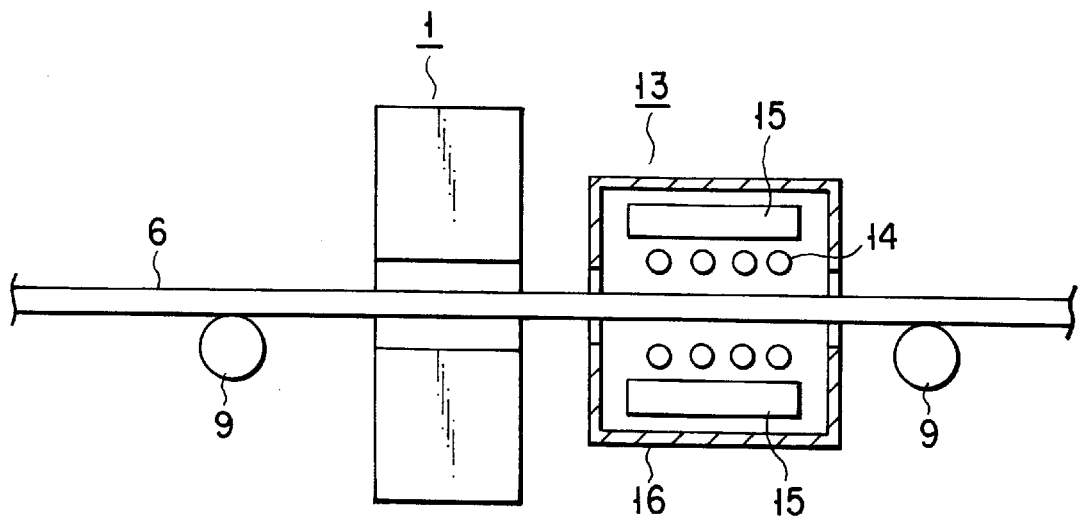
FIG. 8 is a longitudinal sectional side view of the induction heater shown in FIG. 7.
Figure 9:
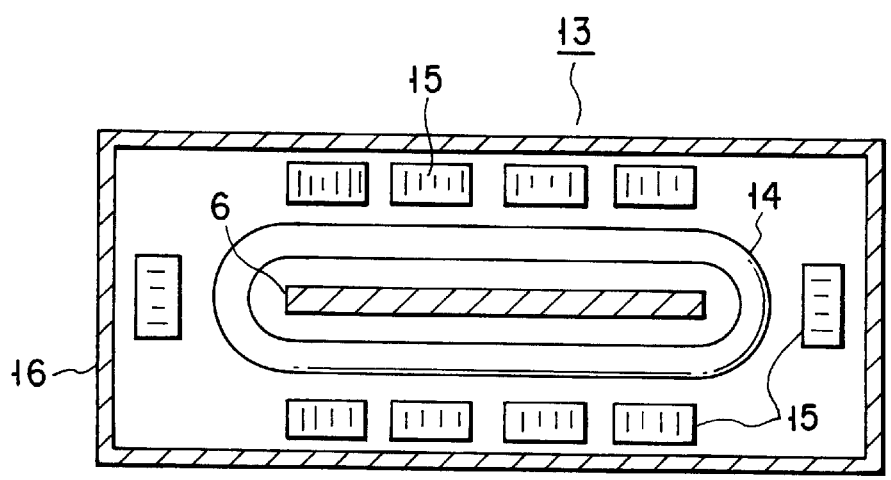
FIG. 9 is a longitudinal sectional front view of a whole heater shown in FIG. 7.

FIGS. 7 to 9 show another embodiment of the present invention. According to this induction heater, two C-shaped inductors 1, 1 are disposed oppositely on both sides of a carried heated steel material 6 supported by table rollers 9 and 9. A whole heater (a coarse bar heater) 13 is for increasing the temperature of the whole heated steel material. This whole heater 13 is provided at the upstream of the C-shaped inductors 1, 1 between the table rollers 9 and 9 disposed in front and at the rear of the C-shaped inductors 1, 1, respectively.

According to the induction heater 13, a plurality of bar-shaped iron cores 15 are disposed along a carrying direction of a heated steel material 6 at the outside of a solenoid coil 14 inside which the heated steel material 6 passes through, as shown in FIG. 8. These bar-shaped iron cores 15 are disposed in a ring shape to encircle the heated steel material 6, and are held within a frame 16 as shown in FIG. 9.

In this induction heater, while the heated steel material 6 is carried in the rolling line, the heated steel material 6 radiates heat and is gradually cooled down during the carrying. When the cooled heated steel material 6 is passed through the whole heater 13, a magnetic flux is generated from the solenoid coil 14. A current is induced along a longitudinal direction of the heated steel material 6. Based on the resistance of the heated steel material itself, the whole heated steel material is induction heated.

The temperatures at the end portions of the heated steel material 6 are lower than the temperature at the center of the heated steel material. Therefore, both ends of the heated steel material 6 are then locally heated by passing the heated steel material 6 through the C-shaped inductors 1, 1, as shown in FIG. 7. Thus, the temperatures at all portions of the heated steel material 6 are made uniform. Thereafter, the heated steel material 6 is rolled.

In this case, the plurality of bar-shaped iron cores 15 are disposed in a ring shape to encircle the heated steel material 6 at the outside of the solenoid coil 14, in the whole heater 13 that is disposed adjacent to the C-shaped inductors 1, 1. Therefore, a circuit as viewed from the heated steel material 6 is similar to that shown in FIGS. 5A and 5B. In other words, the impedance Z becomes large due to the inductance L of the bar-shaped iron cores 15. Therefore, an induced current I2 cannot flow easily near the whole heater 13 that is provided with the bar-shaped iron cores 15.

As a result, sparks are not generated at a contact point between the heated steel material 6 and the table roller 9. Thus, it is possible to manufacture a rolled steel in satisfactory conditions without an arc hurt formed on the heated steel material 6 due to sparks.

In the above explanation, the whole heater 13 provided with the ring-shaped iron core 11 and the bar-shaped iron cores 15 is installed at the upstream of the C-shaped inductors 1, 1 between the table rollers 9, 9 that are disposed in front and at the rear of the C-shaped inductors 1, 1. However, the whole heater 13 may be installed at the downstream instead of the upstream. It is also possible to install the whole heater 13 both upstream and downstream.

As explained above, according to the present invention, it is possible to restrict a current flowing to the earth via the table rollers, by having large impedance based on the inductance of the iron cores. with this arrangement, it is possible to prevent generation of sparks at a contact point between the heated steel material and the table roller, which makes it possible to manufacture a rolled product in satisfactory conditions. Further, as no current flows to the earth via the table rollers, it is not necessary to provide insulation measures for a large number of table rollers unlike the conventional method. This makes it possible to reduce the cost of the facility.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An induction heater comprising:
    at least one pair of C-shaped inductors configured to heat by induction heating both end portions of a heated steel material, carried via table rollers, along a longitudinal direction of the heated steel material; and
    a ring-shaped iron core disposed between the inductors and the table rollers and encircling the heated steel material, said ring-shaped iron core configured to prevent spark generation between the heated steel material and the table rollers by restricting an eddy current flowing to ground via the table rollers.

2. The induction heater according to claim 1, wherein each of the C-shaped inductors comprises:
    a C-shaped iron core having a pair of legs facing each other and sandwiching a gap through which the heated steel material passes; and
    at least one heating coil wound around each of the pair of legs of the C-shaped iron core.

3. An induction heater comprising:
    a least one pair of C-shaped inductors configured to heat by induction heating both end portions of a heated steel material, carried via table rollers, along a longitudinal direction of the heated steel material; and
    a unit configured to prevent spark generation between the heated steel material and the table rollers by restricting an eddy current flowing to ground via the table rollers, comprising
    a solenoid coil disposed between the inductors and the table rollers and configured to encircle the heated steel material, and
    a plurality of bar-shaped iron cores disposed in a ring shape and configured to encircle the heated steel material at the outside of the solenoid coil.

4. The induction heater according to claim 3, wherein each of the C-shaped inductors comprises:
    a C-shaped iron core having a pair of legs facing each other and sandwiching a gap through which the heated steel material passes; and
    at least one heating coil wound around each of the pair of legs of the C-shaped iron core.

* * * * *